UNITED STATES PATENT OFFICE.

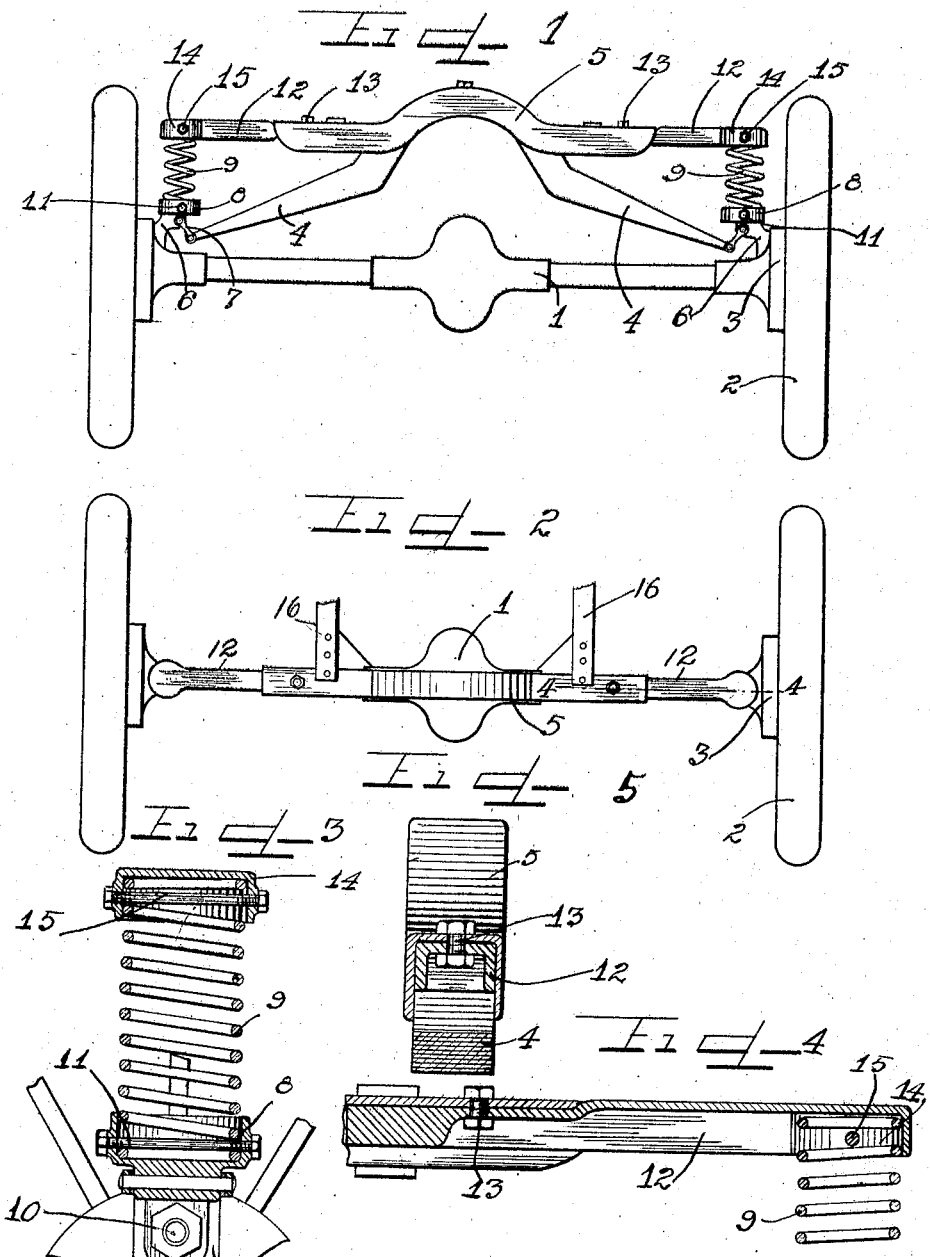

ALPHONSE A. SEBASTIAN, OF CHICAGO, ILLINOIS.

AUXILIARY SPRING FOR MOTOR-VEHICLES.

1,300,658.　　　　　Specification of Letters Patent.　　Patented Apr. 15, 1919.

Application filed June 18, 1917.　Serial No. 175,383.

*To all whom it may concern:*

Be it known that I, ALPHONSE A. SEBASTIAN, a citizen of the United States, and a resident of the city of Chicago, in the county of Cook and State of Illinois, have invented certain new and useful Improvements in Auxiliary Springs for Motor-Vehicles; and I do hereby declare that the following is a full, clear, and exact description of the same, reference being had to the accompanying drawings, and to the numerals of reference marked thereon, which form a part of this specification.

It is the custom with some automobile manufacturers to make a single chassis, mounting one style of body thereon for pleasure and another style body for delivery or truck cars. While the springs act more or less satisfactorily on the passenger cars and lightly loaded delivery cars, they cause considerable expense, delay and annoyance, on the delivery trucks by breakage when they are loaded heavily.

It is an object of this invention to provide auxiliary springs adapted to be easily and quickly attached to the chassis of a Ford or other cars so arranged and disposed that they coact with the main springs of the car to absorb part of the shock and stress caused by the heavy loads.

It is a further and an important object of this invention to provide auxiliary spring mechanism which largely prevents side sway or rocking of the car body on its rear springs and thereby eliminates considerable of the strain on the various parts causing longer life to the car body and suspension.

It is a further object of this invention to provide a device which not only takes up a large part of the compression shock of the load but also prevents quick rebound thereby preventing snapping of a main spring under severe road conditions.

The invention (in a preferred form) consists in the matters hereinafter more fully pointed out and described in the drawings and appended claim.

On the drawings:

Figure 1 is a fragmentary rear elevation of a chassis provided with a device embodying this invention.

Fig. 2 is a top plan view thereof.

Fig. 3 is a longitudinal vertical section of one of the devices.

Fig. 4 is a fragmentary section view on the line 4—4 of Fig. 2, showing in detail the method of attachment of one end of the device.

Fig. 5 is a fragmentary detail taken through the frame at the attaching bolt.

As shown in the drawings:

The reference numeral 1, represents the rear axle and differential of a Ford motor car, 2, the rear wheels, 3, the brake housing, 4, the rear main spring, and 5, the channel end frame members secured thereon, all as is usual in Ford cars.

The reference numeral 6, indicates an attaching member which is adapted to be attached to the brake housing 3, by means of a bolt 10, in place of the usual member found on stock cars and to which the ends of the main springs 4, are pivotally connected by the links 7.

Rigidly secured to the member 6, is a cup shaped housing 8, providing an upwardly directed seat therein to receive one end of the spring 9, and a bolt 11, which is passed through oppositely disposed apertures in the wall of the spring seat and passes above one coil of the spring to firmly hold the spring seated in place.

The frame member 5, is channeled on the under side to embrace and connect with the centrally arched portion of the main spring 4, the ends of which latter extend beyond the ends of the frame member 5, and are connected with the brackets 6 on the brake housings 3, and this frame member is connected to the rear ends of the side sills 16, of the chassis.

The ends of the channeled member 5, project beyond the point at which the sills are connected therewith to furnish a sufficient bearing to support the body of the car, and there is a bolt hole therein adjacent each end to admit a bolt 13 for attaching the car body thereto.

This is the standard construction in Ford motor cars, and in my invention, I take advantage of this standard construction to effect the attachment of my auxiliary springs so that the upper bracket which connects with the upper end of my spring may be connected to the frame of the car without the necessity of making bolt holes or any change or alteration whatever but by utilizing standard facilities with which the frame of the motor car is already provided.

Rigidly secured to the ends of the channel frame end member 5, are arms or extension members 12, having formed at their outer ends round or cup shaped downwardly facing spring seat housing 14, adapted to receive the upper ends of the springs therein and a bolt 15, which is passed through said housing and firmly engages the last coil of the spring which is held between the bolt and the wall or seat of the housing.

The operation is as follows:

The device is attached by an attaching member or support 6, in lieu of the member that originally comes with the car. This is apertured to permit attachment of the connecting links 7, for the main spring 4. The extension 12, is bolted to the rear end frame member and the spring inserted in the housings, and the bolts 11 and 15, inserted. The car is then ready for use. It will be noted that these springs may be made of any desired strength and coact with the main spring to resist the shock and compression of the load, so that very heavy loads may be moved in these light cars without danger of breaking the main springs.

Furthermore it will be noted that inasmuch as these springs are rigidly secured at their ends in their respective housing seats that they have a tendency to prohibit the quick rebound of the body, thereby prohibiting the severe strain caused by rough and uneven roads and furthermore that owing to the springs being rigidly secured at their ends to the respective seats that these springs exert a pulling tension and prevent swaying and rocking of the car body thereby insuring that the contents of the truck will not be badly shaken up and broken and insuring longer life to the car as a whole.

I am aware that details of the construction may be varied through a wide range and I do not purpose limiting this application otherwise than necessitated by the prior art.

I claim as my invention:

The combination with an automobile having an axle, a brake housing at each end of the axle, a centrally arched main spring above and extending lengthwise of the axle, and a frame member channeled on the underside and centrally embracing and connected with the central arched portion of the main spring, of a bracket on each brake housing pivotally connected with the adjoining end of the main spring and having an upwardly facing annularly flanged spring seat, an extension bracket at each end of the channeled frame member having a downwardly facing annularly flanged spring seat spaced above the seat on the housing bracket, a coil spring interposed between and engaging in said seats so as to be compressed by downward movement of the frame member, and a removable transverse pin extending through apertures in opposite sides of the annular flange of each seat and engaging and retaining the end coils of the coiled spring so that said spring will be extended when the frame member is moved upwardly and resiliently will resist said upward movement.

In testimony whereof I have hereunto subscribed my name in the presence of two subscribing witnesses.

ALPHONSE A. SEBASTIAN.

Witnesses:
CHARLES W. HILLS, Jr.,
EARL M. HARDINE.